(12) United States Patent
Park et al.

(10) Patent No.: US 9,769,160 B2
(45) Date of Patent: Sep. 19, 2017

(54) METHOD AND APPARATUS FOR CONTROLLING ACCESS TO ELECTRONIC DEVICES

(71) Applicant: QUALCOMM Incorporated, San Diego, CA (US)

(72) Inventors: Min-Kyu Park, Seoul (KR); Taesu Kim, Seongnam (KR); Sungrack Yun, Seongnam (KR); Kyu Woong Hwang, Taejon (KR); Jun-Cheol Cho, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 530 days.

(21) Appl. No.: 14/031,995

(22) Filed: Sep. 19, 2013

(65) Prior Publication Data
US 2015/0082406 A1    Mar. 19, 2015

(51) Int. Cl.
*H04L 29/06* (2006.01)
*H04W 12/08* (2009.01)

(52) U.S. Cl.
CPC ...... *H04L 63/0853* (2013.01); *H04L 63/0815* (2013.01); *H04L 63/105* (2013.01); *H04L 63/107* (2013.01); *H04W 12/08* (2013.01)

(58) Field of Classification Search
CPC ............. H04L 63/0853; H04L 63/0815; H04L 63/105; H04L 63/107; H04W 12/08
See application file for complete search history.

(56) References Cited

U.S. PATENT DOCUMENTS

| | | | |
|---|---|---|---|
| 6,088,450 A * | 7/2000 | Davis | G07C 9/00111 235/380 |
| 6,189,105 B1 * | 2/2001 | Lopes | G06F 21/35 726/20 |
| 6,961,541 B2 | 11/2005 | Overy et al. | |
| 8,112,037 B2 | 2/2012 | Ketari | |
| 8,943,187 B1 * | 1/2015 | Saylor | H04L 67/306 709/223 |
| 2003/0003866 A1 * | 1/2003 | Overy | G01S 11/16 455/41.1 |
| 2003/0025603 A1 * | 2/2003 | Smith | G06F 21/35 340/572.8 |
| 2004/0257202 A1 | 12/2004 | Coughlin et al. | |
| 2005/0221798 A1 | 10/2005 | Sengupta et al. | |
| 2005/0266798 A1 * | 12/2005 | Moloney | H04L 63/0435 455/41.2 |

(Continued)

OTHER PUBLICATIONS

International Search Report and Written Opinion for International Application No. PCT/US2014/055402, Mailed on Jan. 5, 2015, 9 pages.

*Primary Examiner* — Michael Pyzocha
(74) *Attorney, Agent, or Firm* — Toler Law Group, P.C.

(57) ABSTRACT

According to an aspect of the present disclosure, a method for controlling access to a plurality of electronic devices is disclosed. The method includes detecting whether a first device is in contact with a user, adjusting a security level of the first device to activate the first device when the first device is in contact with the user, detecting at least one second device within a communication range of the first device, and adjusting a security level of the at least one second device to control access to the at least one second device based on a distance between the first device and the at least one second device.

38 Claims, 8 Drawing Sheets

(56) References Cited

U.S. PATENT DOCUMENTS

| | | |
|---|---|---|
| 2008/0148350 A1 | 6/2008 | Hawkins et al. |
| 2010/0201536 A1 | 8/2010 | Robertson et al. |
| 2011/0195665 A1* | 8/2011 | Friedlaender .......... G08C 17/02 |
| | | 455/41.2 |
| 2011/0214158 A1* | 9/2011 | Pasquero ................ G06F 21/35 |
| | | 726/2 |
| 2011/0314539 A1 | 12/2011 | Horton |
| 2012/0015629 A1* | 1/2012 | Olsen ...................... G06F 21/35 |
| | | 455/411 |
| 2012/0252365 A1* | 10/2012 | Lam ................... G07C 9/00309 |
| | | 455/41.2 |
| 2013/0024932 A1 | 1/2013 | Toebes et al. |
| 2014/0302819 A1* | 10/2014 | McKelvey ........ H04M 1/72527 |
| | | 455/411 |
| 2014/0340997 A1* | 11/2014 | Rahman ................. G04G 21/02 |
| | | 368/10 |
| 2014/0364056 A1* | 12/2014 | Belk .................... H04B 5/0031 |
| | | 455/41.1 |
| 2014/0366123 A1* | 12/2014 | DiBona .................. G06F 21/60 |
| | | 726/16 |
| 2015/0058942 A1* | 2/2015 | Dermu ................. G06F 21/445 |
| | | 726/6 |

* cited by examiner

METHOD AND APPARATUS FOR CONTROLLING ACCESS TO ELECTRONIC DEVICES

TECHNICAL FIELD

The present disclosure relates generally to controlling access to a plurality of electronic devices, and more specifically, to controlling access to a plurality of electronic devices by adjusting security levels.

BACKGROUND

In recent years, personal electronic devices such as smartphones, phablet devices, tablet computers, and the like have become popular among users. In addition, new types of personal electronic devices such as smart watches and smart glasses are being introduced to consumers. Such electronic devices provide users with a variety of functions such as voice and/or data communications, Internet browsing, messaging, photo or video camera, music player, etc.

Conventional electronic devices often store or provide access to personal data such as contact information, messages, photos, financial information, etc. Accordingly, such devices may include a security feature to prevent unauthorized access by others. For example, smartphones and tablet computers typically allow a user to set an access code (e.g., a passcode, a personal information number, a password, etc.) to allow access to the devices. These devices are typically set to a locked state when they are not used for a specified period of time. When the devices are in the locked state, the user may access the devices by inputting the access code to unlock the devices.

As personal electronic devices, users often have more than one such devices. For example, a user may have a smartphone, a tablet computer, a smart watch, and smart glasses. In this case, if the user wants to use the smartphone, the smart watch, and the smart glasses, the user typically needs to unlock each of the devices individually by entering an access code for each device. However, requiring users to manually input an individual access code on each of the electronic devices to be accessed may be inconvenient to the users.

SUMMARY

The present disclosure relates to controlling access to a plurality of electronic devices by adjusting security levels.

According to one aspect of the present disclosure, a method for controlling access to a plurality of electronic devices is disclosed. In this method, it is detected whether a first device is in contact with a user. A security level of the first device is adjusted to activate the first device when the first device is in contact with the user. At least one second device within a communication range from the first device is detected. A security level of the at least one second device is adjusted to control access to the at least one second device based on a distance between the first device and the at least one second device. This disclosure also describes apparatus, a device, a system, a combination of means, and a computer-readable medium relating to this method.

According to another aspect of the present disclosure, an electronic device configured to control access to the electronic device and one or more other electronic devices is disclosed. The electronic device includes a user detection unit, a device managing unit, and a security managing unit. The user detection unit is configured to detect whether the electronic device is in contact with a user. The device managing unit is configured to detect at least one first device within a communication range from the electronic device and determine a distance between the electronic device and the at least one first device. The security managing unit is configured to adjust a security level of the electronic device to activate the electronic device when the electronic device is in contact with the user and adjust a security level of the at least one first device to control access to the at least one first device based on the distance between the electronic device and the at least one first device.

BRIEF DESCRIPTION OF THE DRAWINGS

Embodiments of the inventive aspects of this disclosure will be understood with reference to the following detailed description, when read in conjunction with the accompanying drawings.

DETAILED DESCRIPTION

Reference will now be made in detail to various embodiments, examples of which are illustrated in the accompanying drawings. In the following detailed description, numerous specific details are set forth in order to provide a thorough understanding of the present subject matter. However, it will be apparent to one of ordinary skill in the art that the present subject matter may be practiced without these specific details. In other instances, well-known methods, procedures, systems, and components have not been described in detail so as not to unnecessarily obscure aspects of the various embodiments.

Figure 1:
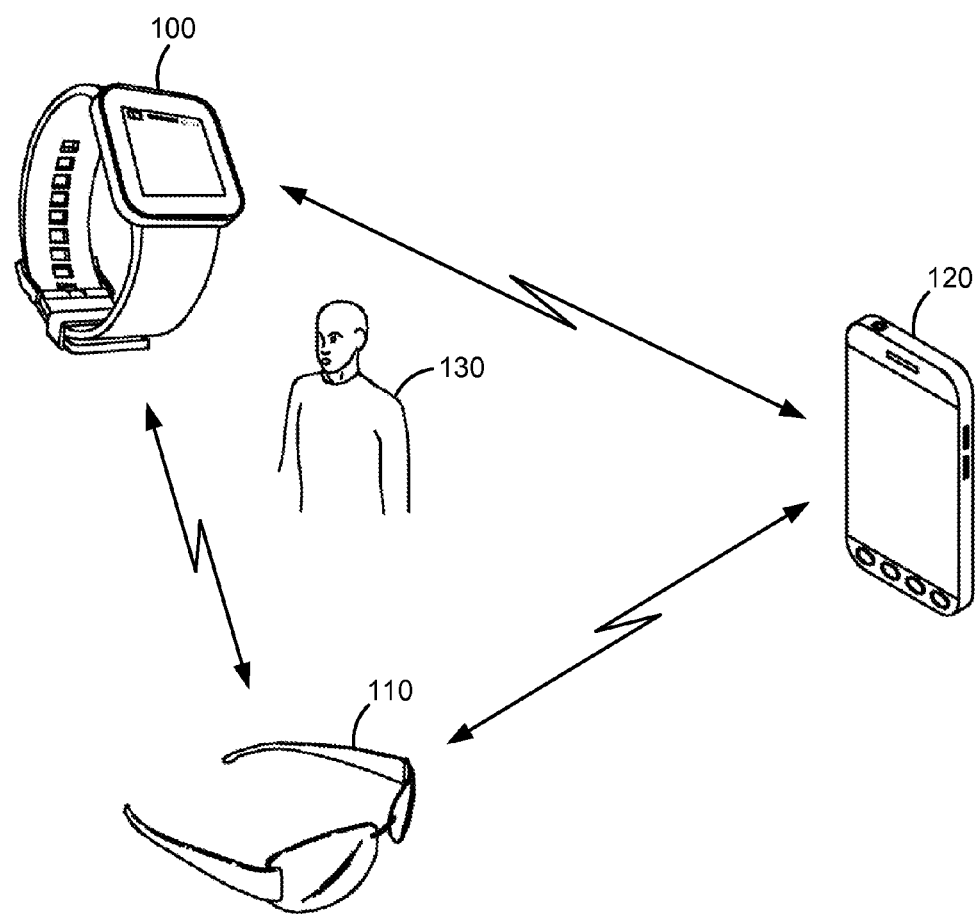
FIG. 1 illustrates a diagram for controlling access to a plurality of electronic devices of a user when the user is in contact with one of the electronic devices, according to one embodiment of the present disclosure.

FIG. 1 illustrates a diagram for controlling access to a plurality of electronic devices 100, 110, and 120 of a user 130 when the user 130 is detected to be in contact with one of the electronic devices 100, 110, or 120, according to one embodiment of the present disclosure. The electronic devices 100, 110, and 120 may be any electronic devices capable of communicating with each other using any suitable wireless or wired communication schemes, and may include smartphones, smart watches, smart glasses, tablet computers, laptop computers, personal computers, and the like. As shown, the electronic devices 100, 110, and 120 include, and are used interchangeably with, a smart watch, smart glasses, and a smartphone, respectively, of the user 130.

The electronic devices 100, 110, and 120 are configured to communicate with each other via a wireless communication technology such as Bluetooth, Wi-Fi Direct, NFC (near field communication), infrared communication technology, or any peer-to-peer technology. In the case of Bluetooth, for example, the user 130 may configure the electronic devices 100, 110, and 120 to recognize and communicate with one another through a pairing process. In one embodiment, the electronic devices 100, 110, and 120 may be configured with a user identification code to allow communication of messages for adjusting security levels. For example, each of the electronic devices 100, 110, and 120 may be assigned a same user identification code (e.g., an email address, a phone number, a personal identification number, etc.) and may communicate with each other to adjust security levels when the user identification code is verified.

The electronic devices 100, 110, and 120 may be worn or carried by the user 130, or kept near the user 130. In this arrangement, the electronic devices 100, 110, and 120 are located within a communication range of each other. For example, the user 130 may be wearing the smart watch 100 and the smart glasses 110 with the smartphone 120 in his or her pocket. In another case, the user 130 may be wearing the smart watch 100 in his or her room while the smart glasses 110 and the smartphone 120 are on a desk in the room.

In the illustrated embodiment, each of the electronic devices 100, 110, and 120 may be configured to control access to the device and the other electronic devices when the user 130 is determined to be in contact with the device. For example, the user 130 may put on the smart watch 100 before picking up the smart glasses 110 and the smartphone 120 from his or her desk. Initially, the electronic devices 100, 110, and 120 may be in a locked state, in which the electronic devices 100, 110, and 120 are configured to detect contact with the user 130. When the user 130 wears the smart watch 100, the smart watch 100 detects contact with the user 130 and operates to change its state from the locked state to an unlocked state. By changing the state to the unlocked state, the smart watch 100 may be immediately accessed by the user 130.

When the smart watch 100 is unlocked, it may detect the smart glasses 110 and the smartphone 120 that are located within its communication range. The smart watch 100 then determines its distances to the smart glasses 110 and the smartphone 120. Based on the distances, the smart watch 100 may function as a key device to control access to the smart glasses 110 and the smartphone 120 by adjusting their security levels. Similarly, the smart glasses 110 and the smartphone 120 may also function as a key device when they detect contact with the user 130. According to one embodiment, the electronic devices 100, 110, and 120 may also communicate with each other to verify a user identification code. For example, the electronic devices 100, 110, and 120 may communicate their user identification codes, directly or via a server, to verify that the user identification codes are the same, which may indicate that the electronic devices 100, 110, and 120 belong to the user 130.

In some embodiments, the security levels of the smart glasses 110 and the smartphone 120 may be adjusted based on whether their distances exceed a predetermined distance from the smart watch 100. For example, if the distance to the smart glasses 110 exceeds the predetermined distance, the security setting of the smart glasses 110 may be adjusted to a highest security level. On the other hand, if the distance to the smart glasses 110 does not exceed the predetermined distance, the security setting of the smart glasses 110 may be reduced (e.g., from a locked state to an unlocked state) so that the user 130 may access the smart glasses 110.

Figure 2:
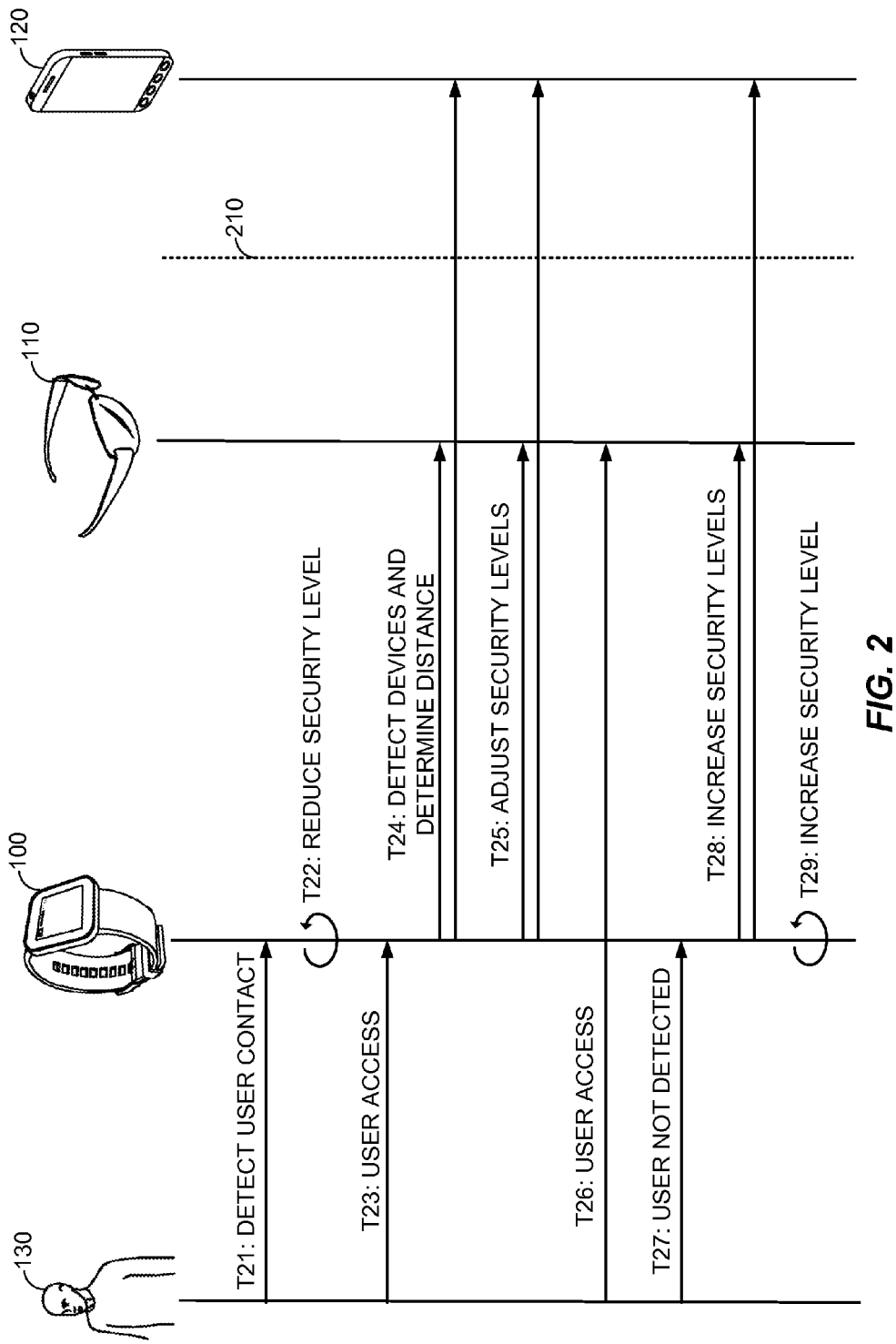
FIG. 2 illustrates a flow diagram for controlling access to a smart watch, smart glasses, and a smartphone by adjusting security levels when the smart watch detects a user, according to one embodiment of the present disclosure.

FIG. 2 illustrates a flow diagram for controlling access to the smart watch 100, the smart glasses 110, and the smartphone 120 by adjusting their security levels when the smart watch 100 detects contact with the user 130, according to one embodiment of the present disclosure. Initially, the smart glasses 110 and the smartphone 120 are located within a communication range of the smart watch 100. In addition, the smart watch 100, the smart glasses 110, and the smartphone 120 are not in contact with the user 130 and thus set to a high security level such as a locked state.

In one embodiment, the smart watch 100, the smart glasses 110, and the smartphone 120 may be configured to have two security levels including a locked state and an unlocked state. For example, when the electronic devices 100, 110, and 120 are in the locked state, they are not accessible by the user 130. On the other hand, the electronic devices 100, 110, and 120 may be accessed for operation by the user 130 in the unlocked state. In another embodiment, other security levels may be provided in the electronic devices 100, 110, and 120 in addition to the locked state and unlocked state, which may be the highest and lowest security levels, respectively. For instance, the electronic devices 100, 110, and 120 may also be set to an intermediate security level between the locked and unlocked states. In the intermediate security level, applications that require a user authentication (e.g., a password, pin number, etc.) may not be accessed, while other applications that do not require such user authentication may be accessed.

When the user 130 wears the smart watch 100 on his or her wrist, the smart watch 100 may detect contact with the user 130, at T21. As used herein, the term "contact" refers to an act or state of physical or proximate touching and may include, for example, a physical contact, a proximate contact without a physical contact, and an act of manipulating or operating an electronic device. Additionally, a voice input from a user may be inferred as contact with the user. When the smart watch 100 detects contact with the user 130, the smart watch 100 may adjust its security level from the locked state to allow access by the user 130, at T22. For example, the security level of the smart watch 100 may be reduced from a locked state to an unlocked state in the case of two security levels. When the smart watch 100 has been unlocked, it may then be accessed by the user 130 for operation, at T23. Alternatively, the security level of the smart watch 100 may be reduced to an intermediate level to allow the user 130 to access applications on the smart watch 100 that do not require user authentication. In this case, the user 130 may provide user authentication to further reduce the security level to the lowest security level (e.g., unlocked state) for accessing all applications.

Once the smart watch 100 is unlocked, it proceeds, at T24, to detect the smart glasses 110 and the smartphone 120 and determine distances to the smart glasses 110 and the smartphone 120, respectively. In this process, the smart watch 100 may communicate wirelessly to detect the smart glasses 110 and the smartphone 120 that are within its communication range according to a wireless communication technology such as Bluetooth, Wi-Fi Direct, NFC, infrared communication technology, etc. The smart watch 100 may also determine the distances to the smart glasses 110 and the smartphone 120 using any suitable distance calculation schemes for wireless communication technologies. For example, when Bluetooth is used for communication, the smart watch 100 may determine its distance to the smart glasses 110 or the smartphone 120 based on a power level of a received signal such as a received signal strength indicator (RSSI).

When the distances to the smart glasses 110 and the smartphone 120 have been determined, the smart watch 100 may function as a key device to adjust security levels for controlling access to the smart glasses 110 and the smartphone 120, at T25. In some embodiments, the smart watch 100 may adjust the security levels of the smart glasses 110 and the smartphone 120 based on whether the smart glasses 110 and the smartphone 120 are within a predetermined distance 210 from the smart watch 100. As shown, the smart glasses 110 are located within the predetermined distance 210 while the smartphone 120 is located beyond the predetermined distance 210. Since the distance from the smart watch 100 to the smart glasses 110 is less than or equal to the predetermined distance 210, the smart watch 100 may transmit a message to the smart glasses 110 to reduce the security level (e.g., from a locked state to an unlocked state). Once the security level of the smart glasses 110 is reduced to a lower level (e.g., unlocked state), the user 130 may access the smart glasses 110 for operation, at T26.

In the case of the smartphone 120, the smart watch 100 may determine that the distance from the smart watch 100 is greater than the predetermined distance 210 and thus transmit a message to the smartphone 120 to adjust the security level of the smartphone 120 to a higher security level. In one embodiment, if the smartphone 120 is already set to the highest security level (e.g., a locked state), it remains in the same security level. On the other hand, if the smartphone 120 is in a lower security level (e.g., an unlocked state or an intermediate state), it may adjust the security level to a higher level.

In the illustrated embodiment, the user 130 may take off the smart watch 100 and the smart watch 100 may detect that the user 130 is no longer in contact, at T27. The smart watch 100 then may send messages to the smart glasses 110 and the smartphone 120 to increase their security levels to a higher level (e.g., locked state), at T28. The smart watch 100 then may increase its security level to a higher level (e.g., locked state), at T29. Although the smart watch 100 is used to control access to the smart glasses 110 and the smartphone 120, it should be appreciated that the smart glasses 110 and the smartphone 120 may also be used to control access to the smart watch 100, the smart glasses 110, and the smartphone 120.

Figure 3:
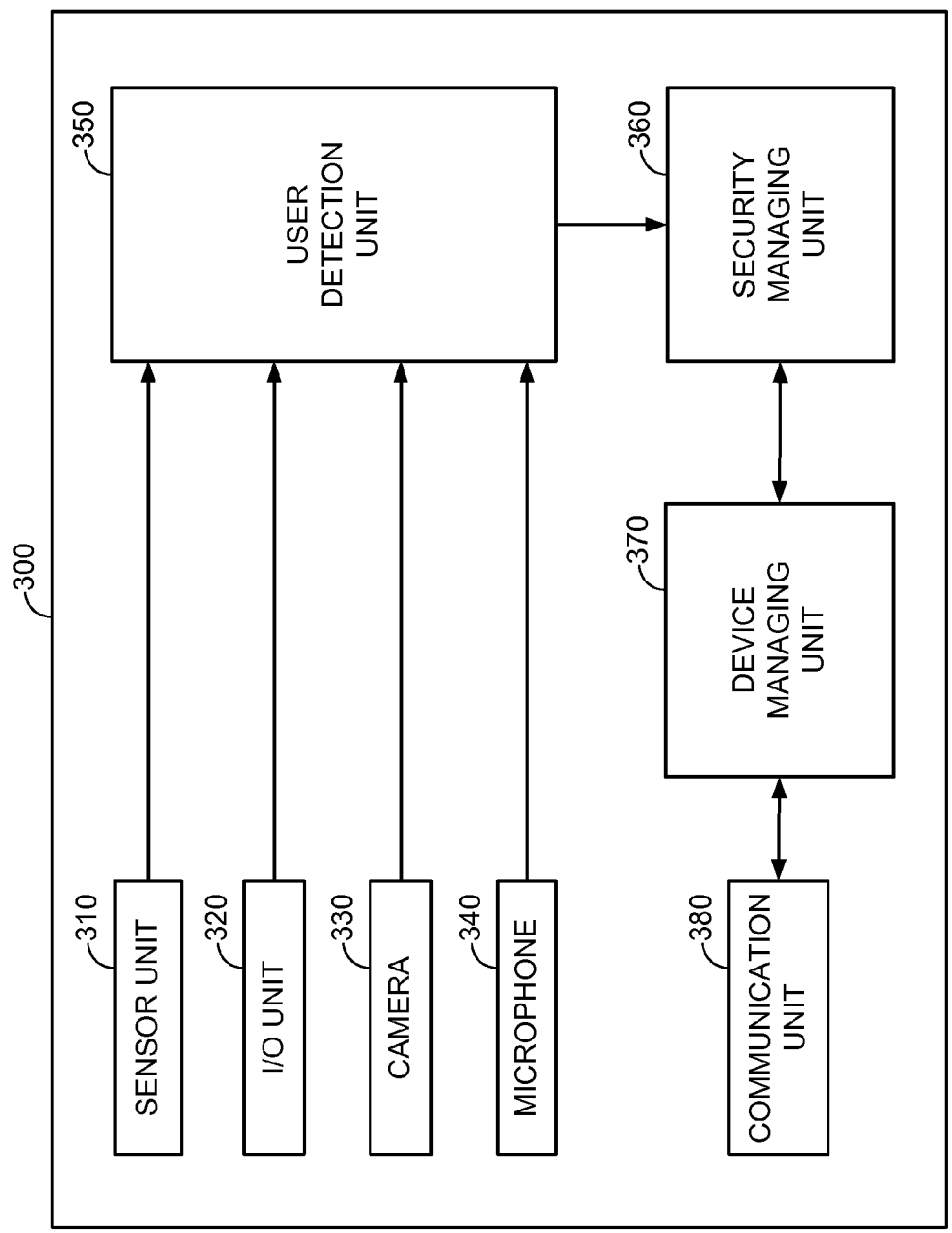
FIG. 3 illustrates a block diagram of an electronic device configured to control access to the electronic device and other electronic devices by adjusting security levels, according to one embodiment of the present disclosure.

FIG. 3 illustrates a block diagram of an electronic device 300 configured to control access to the electronic device 300 and other electronic devices in response to contact with a user, according to one embodiment of the present disclosure. The electronic device 300 may include a sensor unit 310, an I/O (input/output) unit 320, a camera 330, a microphone 340, a user detection unit 350, a security managing unit 360, a device managing unit 370, and a communication unit 380. The smart watch 100, the smart glasses 110, and the smartphone 120 illustrated in FIGS. 1 and 2 may employ the basic configuration of the electronic device 300.

The sensor unit 310 in the electronic device 300 is configured to detect contact with an external object or a user and generate data associated with the detected contact. For example, the contact may be a touch input of the user, a proximate contact with the user, a motion of the electronic device 300, etc. In addition, the I/O unit 320 may also receive a key or button input, which may be inferred as contact with the user, and generate data associated with the detected key or button input. The data associated with the detected contact from the sensor unit 310 or the I/O unit 320 is then provided to the user detection unit 350 as detection data. As will be described in more detail with reference to FIG. 4, the sensor unit 310 may include at least one of a contact sensor, a proximity sensor, an accelerometer, a gyroscope, etc.

The user detection unit 350 receives the detection data from the sensor unit 310 or the I/O unit 320 and determines whether a user is in contact with the electronic device 300 based on the detection data. In one embodiment, the user detection unit 350 may apply predetermined criteria or a threshold value to determine if the detection data is indicative of contact with a user. For example, detection data for a physical contact may include data representing a change in an electrical resistance value or an electrical capacitance value, an electrical conductance value, etc. On the other hand, detection data for a motion of the electronic device 300 may include acceleration or orientation data. In the case of a proximate contact, detection data may include data representing a change in an electromagnetic field value or a received signal.

In the case of key or button input, the user detection unit 350 may directly determine that the user is in contact. Alternatively, the user detection unit 350 may determine that the user is in contact when the user has inputted a proper access code or pin number via the I/O unit 320. For example, when a key or button input is received, the electronic device 300 may be configured to allow the user to input the proper access code or pin number through the I/O unit 320, which may be a touch screen device. In this case, the user detection unit 350 may ignore detection data from the sensor unit 310 or temporarily disable the sensor unit 310 to allow the user to input an access code or pin number and detect the user based on whether a correct access code or pin number has been received.

If the detection data is determined to indicate contact with a user, the user detection unit 350 notifies the security managing unit 360 that contact with a user has been detected. In response, the security managing unit 360 may adjust its security level from a locked state to an unlocked state to allow access by the user. Alternatively, the security managing unit 360 may reduce its security level to an intermediate level to allow the user to access applications in the electronic device 300 that do not require user authentication. In this case, the user may provide user authentication information to further reduce the security level to the lowest security level (e.g., unlocked state) for accessing all applications. For example, the user may input an access or pass code, an eye or facial scan, or voice input through the I/O unit 320, the camera 330, or the microphone 340, respectively, to verify the user.

In addition to adjusting the security level of the electronic device 300, the security managing unit 360 also informs the device managing unit 370 to detect other electronic devices within a communication range of the electronic device 300 and determine distances to detected electronic devices. The device managing unit 370 manages communication with other electronic devices via the communication unit 380. In response to the notification from the security managing unit 360, the device managing unit 370 may detect other electronic devices within the communication range via the communication unit 380, which may implement a wireless communication technology such as Bluetooth, Wi-Fi Direct, NFC, infrared communication technology, etc.

The device managing unit 370 may also determine the distances to the detected devices using any suitable distance calculation schemes for wireless communication technologies as described with reference to FIG. 2 above. Alternatively or additionally, the electronic device 300 may be configured to determine a distance to another electronic device based on ultrasound communication via one or more speakers and microphones. In this case, the device managing unit 370 may calculate the distance to the other device based on a time of flight (TOF) of an ultrasound signal in communication with the other device.

According to another embodiment, the electronic device 300 may use audio fingerprinting to determine whether the other devices are located within the predetermined distance 210 of the electronic device 300. For example, the microphone 340 of the electronic device 300 and a microphone of another electronic device in a same location may capture similar environment sounds and thus extract similar audio fingerprints from the similar environment sounds. Accordingly, the electronic device 300 may determine that the other electronic device is located within the predetermined distance 210 by inferring that the other electronic device is in the same location. After detecting other devices and distances to the devices, the device managing unit 370 transmits identification of the detected devices and their distances from the electronic device 300 to the security managing unit 360.

Based on the identification of the detected devices and their distances from the electronic device 300, the security managing unit 360 may adjust security levels of the detected devices for controlling access to the detected devices. In some embodiments, the security managing unit 360 determines whether the security levels of the detected devices are to be decreased or increased based on whether the detected devices are within a predetermined distance from the electronic device 300. If the distance to a detected device is less than or equal to the predetermined distance, the security managing unit 360 may transmit a message to the detected device to adjust the security level of the detected device to a lower level (e.g., from a locked state to an unlocked state) via the device managing unit 370 and the communication unit 380. On the other hand, if the security managing unit 360 determines that the distance to the detected device is greater than the predetermined distance, it may transmits a message to the detected device to adjust the security level of the detected device to a higher security level.

In some embodiments, the security managing unit 360 may receive a message acknowledging an adjustment of the security level from the detected device. Upon receiving the acknowledgement message, the security managing unit 360 may generate and output a notification of the adjusted security level for the detected device. For example, when the security managing unit 360 receives the acknowledgment message from the detected device located beyond the predetermined distance from the electronic device 300, it may generate and display a message indicating that the security level of the detected device has been increased. On the other hand, when the security managing unit 360 receives the acknowledgment message from the detected device located within the predetermined distance from the electronic device 300, it may generate and display a message indicating that the security level of the detected device has been reduced.

In some embodiments, the security managing unit 360 may be configured to adjust the security level of the electronic device 300 in response to a message from another electronic device (i.e., a key device) to increase or reduce the security level. If the message indicates increasing the security level, the security managing unit 360 increases the security level of the electronic device 300. On the other hand, if the message indicates reducing the security level, the security managing unit 360 adjusts the security level of the electronic device 300 to a lower level (e.g., an unlocked state). When the security level of the electronic device 300 has been adjusted in response to the message from the other electronic device, the security managing unit 360 may generate and output a notification of the adjusted security level. Additionally or alternatively, the security managing unit 360 may transmit a message acknowledging the adjustment of the security level to the other electronic device.

When the security managing unit 360 receives a message from another electronic device to adjust the security level of the electronic device 300, it may receive an indication of whether a user is in contact with the electronic device 300 from the user detection unit 350. If the user is determined to be in contact, the security managing unit 360 maintains the security level without performing the requested adjustment from the other electronic device. Otherwise, the security managing unit 360 may adjust the security level of the electronic device according to the message from the other electronic device. When the security level of the electronic device 300 has not been adjusted in response to the message from the other electronic device, the security managing unit 360 may transmit a message indicating that the security level has not been changed to the other electronic device.

In some embodiments, the sensor unit 310 continuously or periodically monitors contact with a user and provides detection data to the user detection unit 350. When the electronic device 300 is a wearable device, the sensor unit 310 may detect that a user is no longer wearing or in contact with the electronic device 300. For a non-wearable device such as a smartphone, the user detection unit 350 may determine that a user is no longer in contact when an input indicative of a user contact has not been received for a predetermined time after a most recent input indicating a user contact.

If the user detection unit 350 determines that the electronic device 300 is no longer in contact with the user, it notifies the security managing unit 360 that a user is not in contact. The security managing unit 360 then transmits a message or a signal to the device managing unit 370 to send a message to increase the security level of other devices within the communication range of the communication unit 380. In addition, the security managing unit 360 increases the security level of the electronic device 300 to a higher level (e.g., a locked state).

Figure 4:
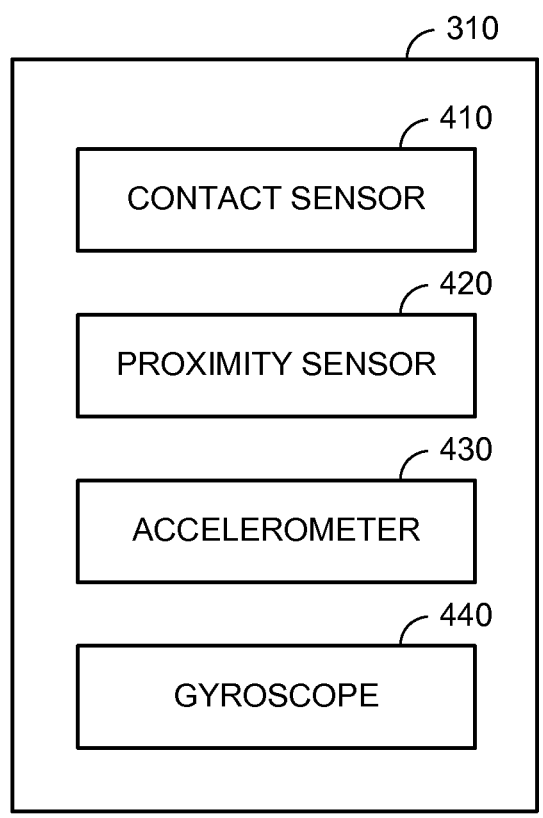
FIG. 4 illustrates a block diagram of a sensing unit in an electronic device, according to one embodiment of the present disclosure.

FIG. 4 illustrates a block diagram of the sensor unit 310 in the electronic device 300, according to one embodiment of the present disclosure. As shown, the sensor unit 310 may include a contact sensor 410, a proximity sensor 420, an accelerometer 430, and a gyroscope 440. Additionally or alternatively, the sensor unit 310 may include any other types of sensors that detect physical or proximate contact with a user.

The contact sensor 410 is configured to sense physical contact with a user and may include a touch sensor, a force sensor, or a pressure sensor for detecting a touch, force, or pressure applied to the electronic device 300, respectively.

The contact sensor 410 may be implemented as a resistive or a capacitive type to generate detection data when contact with a user is detected. For example, the resistive-type contact sensor may output a change in an electrical resistance value as detection data in response to physical contact. Similarly, the capacitive-type contact sensor may output a change in an electrical capacitance value as detection data.

The contact sensor 410 may also be implemented as a skin sensor or a tension sensor. The skin sensor may be adapted to detect an electrical conductance of a user's skin and output the electrical conductance value as detection data. The tension sensor may detect a tension force applied to the electronic device 300 and output the detected tension force as detection data. In one embodiment, the tension sensor may be provided for any electronic device (e.g., a smart watch) that includes a strap to which a tension force may be applied.

The proximity sensor 420 detects presence of an object that is located in close proximity to the electronic device 300 with or without physical contact. The proximity sensor 420 may be implemented employing any suitable schemes for detecting presence of an object using, for example, an electromagnetic field or beam. For instance, when an object is in close proximity to the electromagnetic field or beam, a change in the electromagnetic field or a return signal may be detected by the proximity sensor 420 and output as detection data to the user detection unit 350.

In the sensor unit 310, the accelerometer 430 and the gyroscope 440 are used to detect a motion of the electronic device 300 to infer that a user is in contact. The accelerometer 430 detects an acceleration of the electronic device 300 and outputs the detected acceleration as detection data to the user detection unit 350. Based on the detected acceleration data, the user detection unit 350 may also determine an orientation of the electronic device 300 in inferring whether the data is indicative of user contact. The gyroscope 440 is configured to detect an orientation of the electronic device 300 and output the orientation as detection data. In one embodiment, the accelerometer 430 and the gyroscope 440 operate continuously to detect an acceleration and an orientation of the electronic device 300, respectively, which are provided to the user detection unit 350.

When a user moves the electronic device 300, the accelerometer 430 or the gyroscope 440 detects the movement and provides acceleration data and orientation data, respectively, to the user detection unit 350 as detection data. The user detection unit 350 then determines whether there is a change in the acceleration or orientation based on one or more previous acceleration and orientation data. If the user detection unit 350 determines a change in the acceleration or orientation, it outputs a signal to the security managing unit 360 that a user has been detected.

In some embodiments, the user detection unit 350 may infer contact with a user when a set of detection data received from the accelerometer 430 or the gyroscope 440 is indicative of one or more predetermined motions. For example, a predetermined motion may include a motion such as moving the electronic device 300 in a specified path or pattern (e.g., a FIG. 8 motion). Although the accelerometer 430 or the gyroscope 440 is illustrated in the sensor unit 310, either or both may be used alone or in combination to detect a change in the movement of the electronic device 300.

When the electronic device 300 is a wearable device, such as the smart watch 100 or the smart glasses 110, the user detection unit 350 may also be configured to determine whether the electronic device 300 is being worn by the user 130 based on detection data from the contact sensor 410. For example, the contact sensor 410 may detect a tension force applied to the strap of the smart watch 100, an electrical conductance value of skin, and the like. In this case, the user detection unit 350 may detect that the electronic device 300 is being worn by a user and thus is in contact with the user when the detected force or electrical conductance value exceeds a predetermined threshold value.

Figure 5:
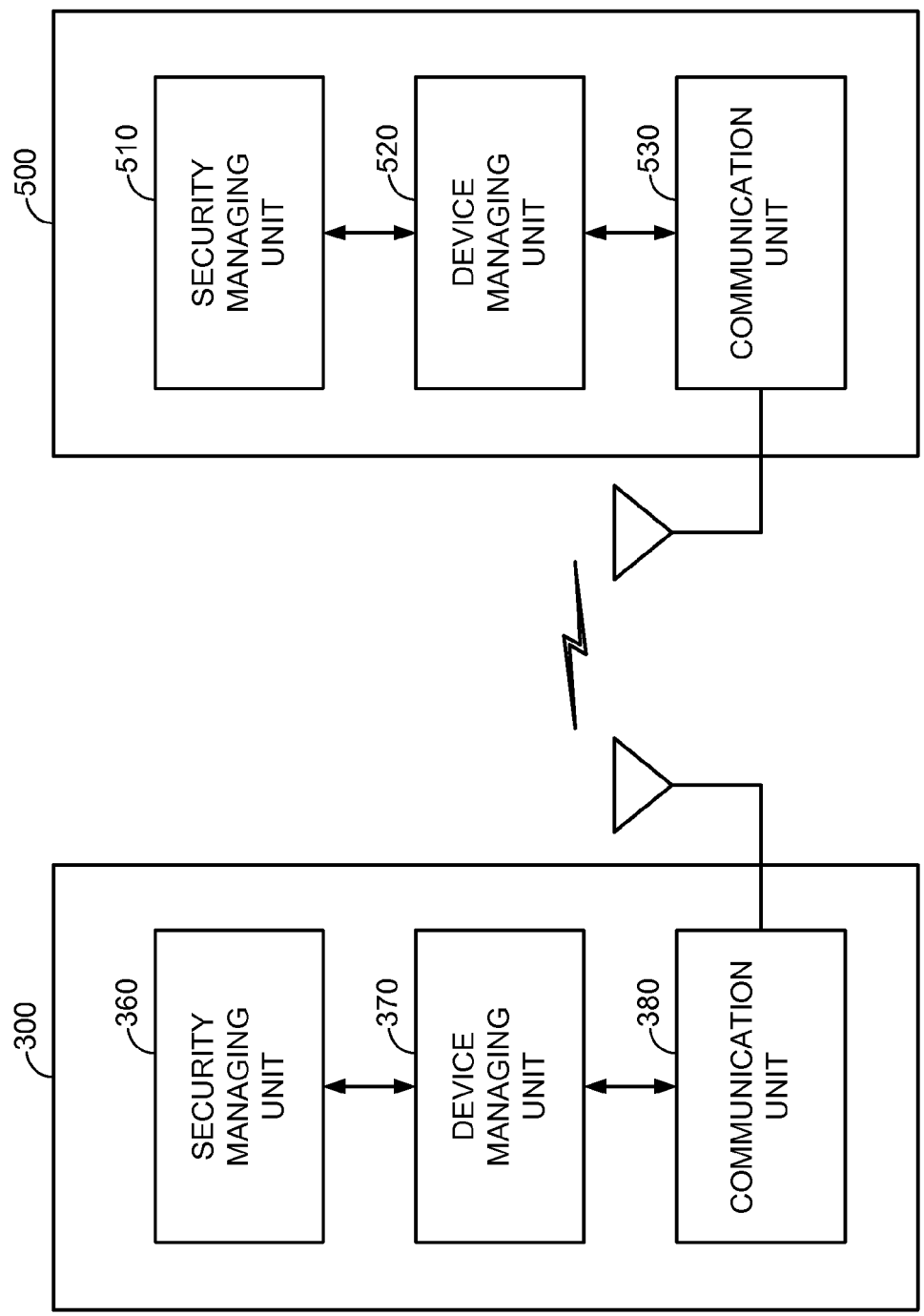
FIG. 5 illustrates a block diagram of portions of an electronic device configured to control a security level of another electronic device located within a communication range, according to one embodiment of the present disclosure.

FIG. 5 illustrates a block diagram of portions of the electronic device 300 configured to control a security level of an electronic device 500 located within a communication range, according to one embodiment of the present disclosure. As illustrated, the electronic device 300 may include the security managing unit 360, the device managing unit 370, and the communication unit 380 and functions as a key device to control a security level of the electronic device 500. Similar to the electronic device 300, the electronic device 500 may include a security managing unit 510, a device managing unit 520, and a communication unit 530, and may also include other units similar to the sensor unit 310, the I/O unit 320, the camera 330, the microphone 340, and the user detection unit 350 of the electronic device 300.

When the security managing unit 360 informs the device managing unit 370 to detect other electronic devices, the device managing unit 370 detects the electronic device 500 located within a communication range of the electronic device 300 via the communication unit 380. In this process, the communication units 380 and 530 may communicate under the control of the device managing units 370 and 520.

In addition, the device managing unit 370 determines a distance to the electronic device 500 based on communications via the communication units 380 and 530 and provides the distance information to the security managing unit 360. If the distance is within a predetermined distance of the electronic device 300, the security managing unit 360 transmits a signal or a message to the device managing unit 370 to send a message for lowering a security level to the electronic device 500. On the other hand, if the distance is beyond the predetermined distance, the security managing unit 360 sends a signal or a message to the device managing unit 370 to transmit a message for increasing a security level to the electronic device 500.

In response to the signal or message to adjust the security level of the electronic device 500, the device managing unit 370 transmits a message to the electronic device 500 to adjust the security level via the communication unit 380. The message transmitted by the device managing unit 370 thus includes a message to reduce or increase the security level according to the distance between the electronic devices 300 and 500. The device managing unit 520 in the electronic device 500 receives the message to adjust the security level via the communication unit 530 and transmits a message to adjust the security level to the security managing unit 510.

In one embodiment, the security managing unit 510 adjusts the security level of the electronic device 500 according to the received message. If the message indicates increasing the security level when the electronic device 500 is located beyond the predetermined distance, the security managing unit 510 increases the security level of the electronic device 500. In one embodiment, when the message indicates increasing the security level, but the electronic device 500 is already set to the highest security level (e.g., a locked state), the security managing unit 510 may maintain the same security level. On the other hand, if the message indicates reducing the security level when the electronic device 500 is within the predetermined distance, the security managing unit 510 lowers the security level of the electronic device 500, for example, from a locked state to an unlocked state. Alternatively, if the message indicates decreasing the security level, but the electronic device 500 is already set to the lowest security level (e.g., an unlocked state), the security managing unit 510 may continue to maintain the same security level.

In some embodiments, the electronic device 500 may adjust its security level based on a user detection unit (not shown). For example, the electronic device 500 may be the smart glasses 110 or the smartphone 120 that is detected to be in contact with the user (e.g., touched or worn by the user) when the message to adjust its security level is received from the electronic device 300. In this case, the security managing unit 510 may assign a higher priority to the user detection from the user detection unit and maintain its security level and ignore the message from the electronic device 300. Similarly, if the electronic device 300 is no longer in contact with the user, the security managing unit 360 may send a message to the security managing unit 510 to increase the security level of the electronic device 500. In response, the security managing unit 510 may increase the security level of the electronic device 500, for example, from an unlocked state to a locked state. On the other hand, if the electronic device 500 is in contact with the user, the security managing unit 510 may continue to maintain its security level.

Figure 6:
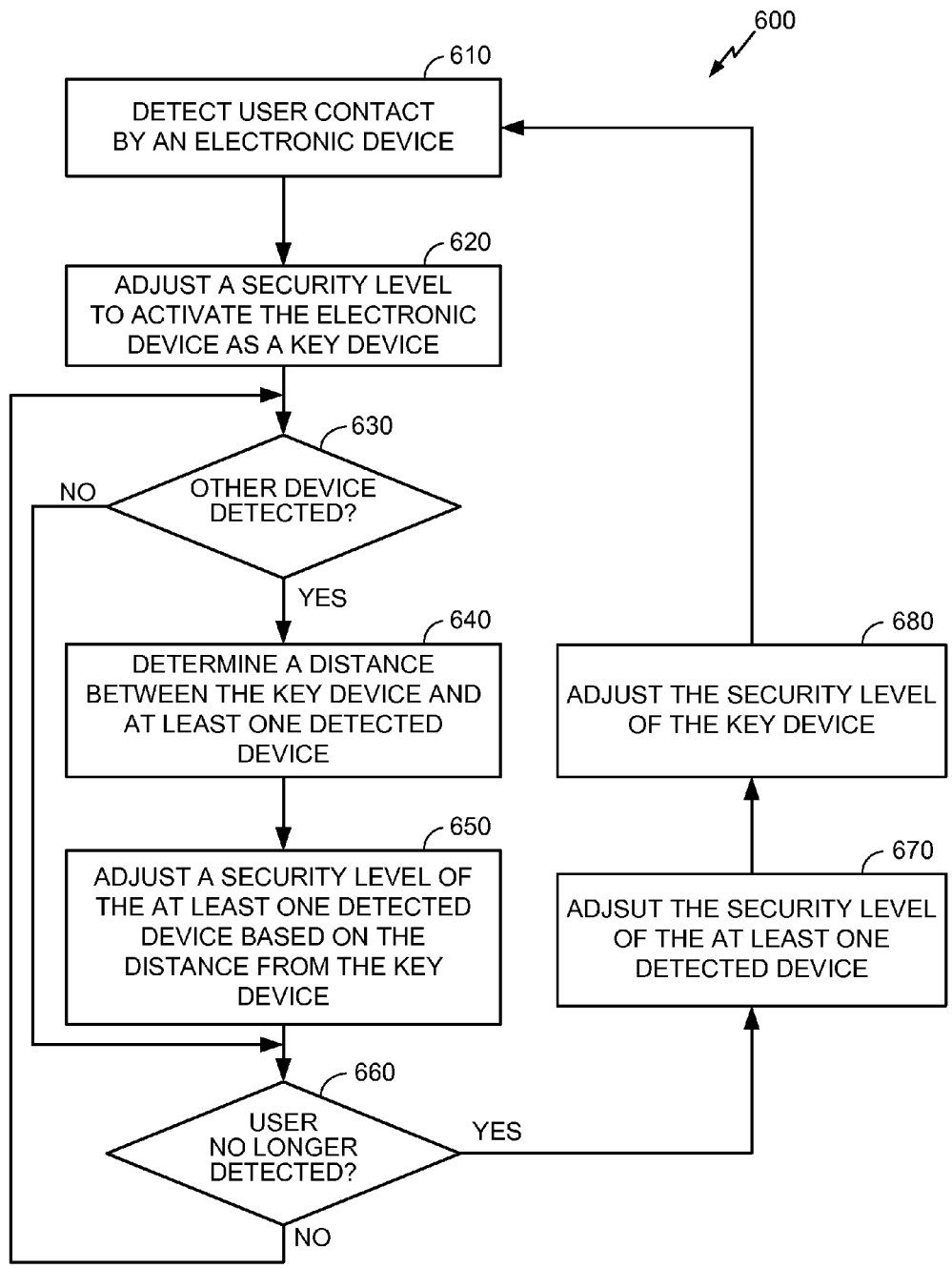
FIG. 6 is a flow chart of a method for controlling access to a plurality of electronic devices by adjusting security levels of the electronic devices, according to one embodiment of the present disclosure.

FIG. 6 is a flow chart of a method 600 for controlling access to a plurality of electronic devices by adjusting security levels of the electronic devices, according to one embodiment of the present disclosure.

Initially, the electronic device 300 detects contact with a user, at 610. When the electronic device 300 detects contact with the user, the electronic device 300 may adjust its security level to activate as a key device, at 620. For example, the security level of the electronic device 300 may be reduced from a locked state to an unlocked state in the case of two security levels. Alternatively, the security level of electronic device 300 may be reduced to an intermediate level to allow the user to access applications on the electronic device 300 that do not require user authentication. In this case, the user may provide user authentication to further reduce the security level to the lowest security level (e.g., unlocked state) for accessing all applications.

Once the electronic device 300 is unlocked, it proceeds, at 630, to detect at least one other device. If at least one other device is not detected, the method 600 proceeds to 660 to detect whether the user is no longer in contact. On the other hand, if at least one other device is detected, the electronic device 300 may determine a distance to the at least one detected device, at 640. In this process, the electronic device 300 may communicate wirelessly to detect other devices that are within its communication range according to a wireless communication technology such as Bluetooth, Wi-Fi Direct, NFC, infrared communication technology, etc. The electronic device 300 may also determine the distance to the detected devices using any suitable distance calculation schemes for wireless communication technologies. For example, when Bluetooth is used for communication, the electronic device 300 may determine its distance to the detected devices based on a power level of a received signal such as a received signal strength indicator (RSSI). When the distance to the at least one detected device has been determined, the electronic device 300 may function as a key device to adjust the security level for controlling access to the at least one detected device, at 650.

The electronic device 300 may detect whether the user is no longer in contact, at 660. If the contact is detected, the method 600 proceeds back to 630 to detect at least one other device. Otherwise, the electronic device 300 then may send messages to the at least one detected device to increase the security level to a higher level (e.g., locked state), at 670. The electronic device 300 then may increase its security level to a higher level (e.g., locked state), at 680. Then, the method 600 proceeds back to 610 to detect contact with a user.

Figure 7:
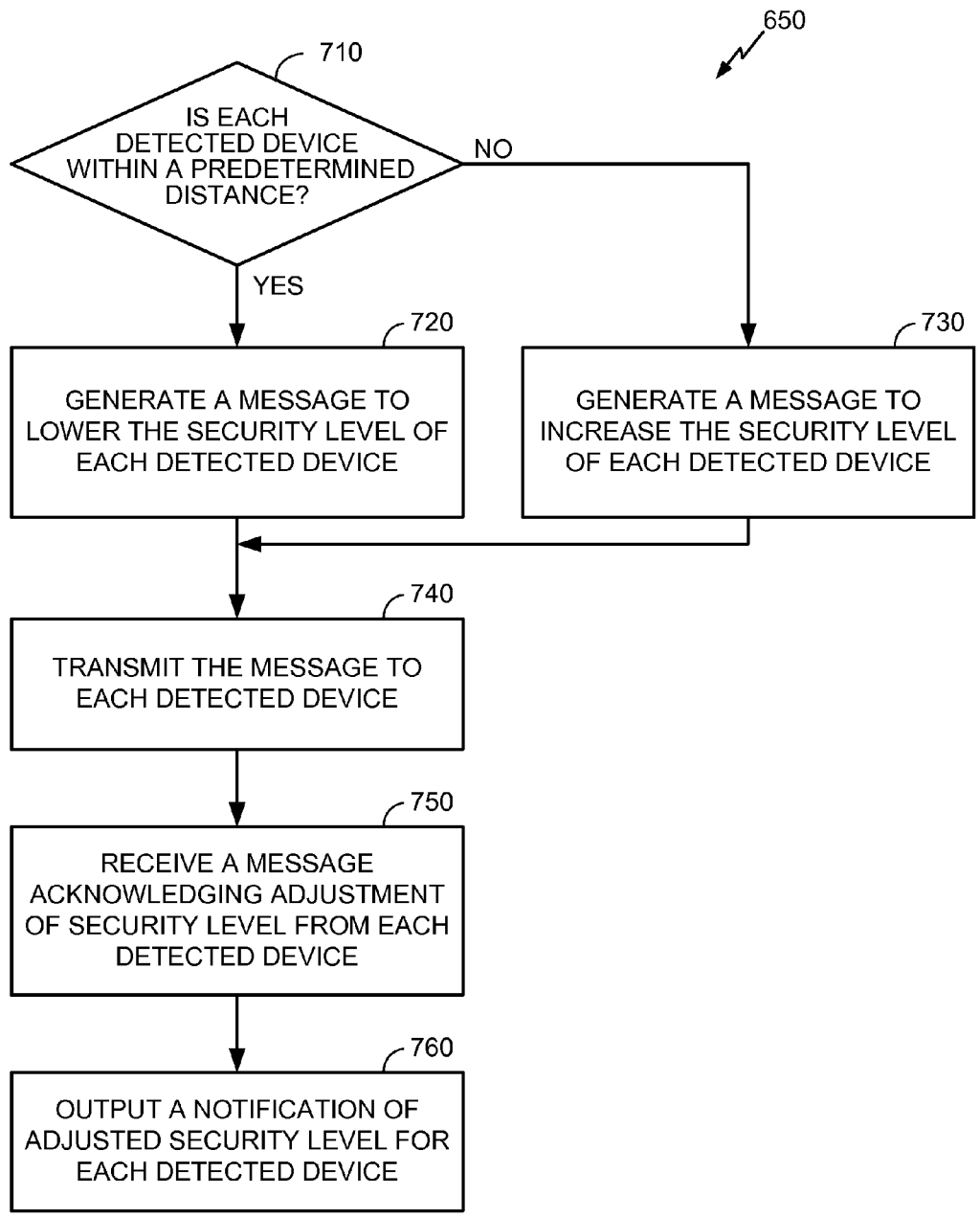
FIG. 7 is a flow chart of a method for adjusting security levels of a plurality of detected devices based on distances of the detected devices from an electronic device, according to one embodiment of the present disclosure.

FIG. 7 is a flow chart of a detailed method 650 for adjusting security levels of a plurality of detected devices based on distances of the detected devices from the electronic device 300, according to one embodiment of the present disclosure.

Initially, the electronic device 300 determines whether each of the detected devices is located within a predetermined distance from the electronic device 300, at 710. If each detected device is located within the predetermined distance from the electronic device 300, the electronic device 300 may generate a message to lower the security level of each detected device within the predetermined distance, at 720. On the other hand, if each detected device is located beyond the predetermined distance, the electronic device 300 may generate a message to increase the security level of each detected device located beyond the predetermined distance, at 730.

Once the message is generated, the electronic device 300 may transmit the message to each detected device, at 740. Then, the electronic device 300 may receive a message acknowledging an adjustment of the security level from each detected device, at 750. Upon receiving the message acknowledging the adjustment of the security level, the electronic device 300 may generate and output a notification of the adjusted security level for each detected device, at 760. For example, when the electronic device 300 receives the acknowledgment message from each detected device located beyond the predetermined distance from the electronic device 300, it may generate and output a notification indicating that the security level of each detected device has been increased. On the other hand, when the electronic device 300 receives the acknowledgment message from each detected device located within the predetermined distance from the electronic device 300, it may generate and output a notification indicating that the security level of each detected device has been reduced.

Figure 8:
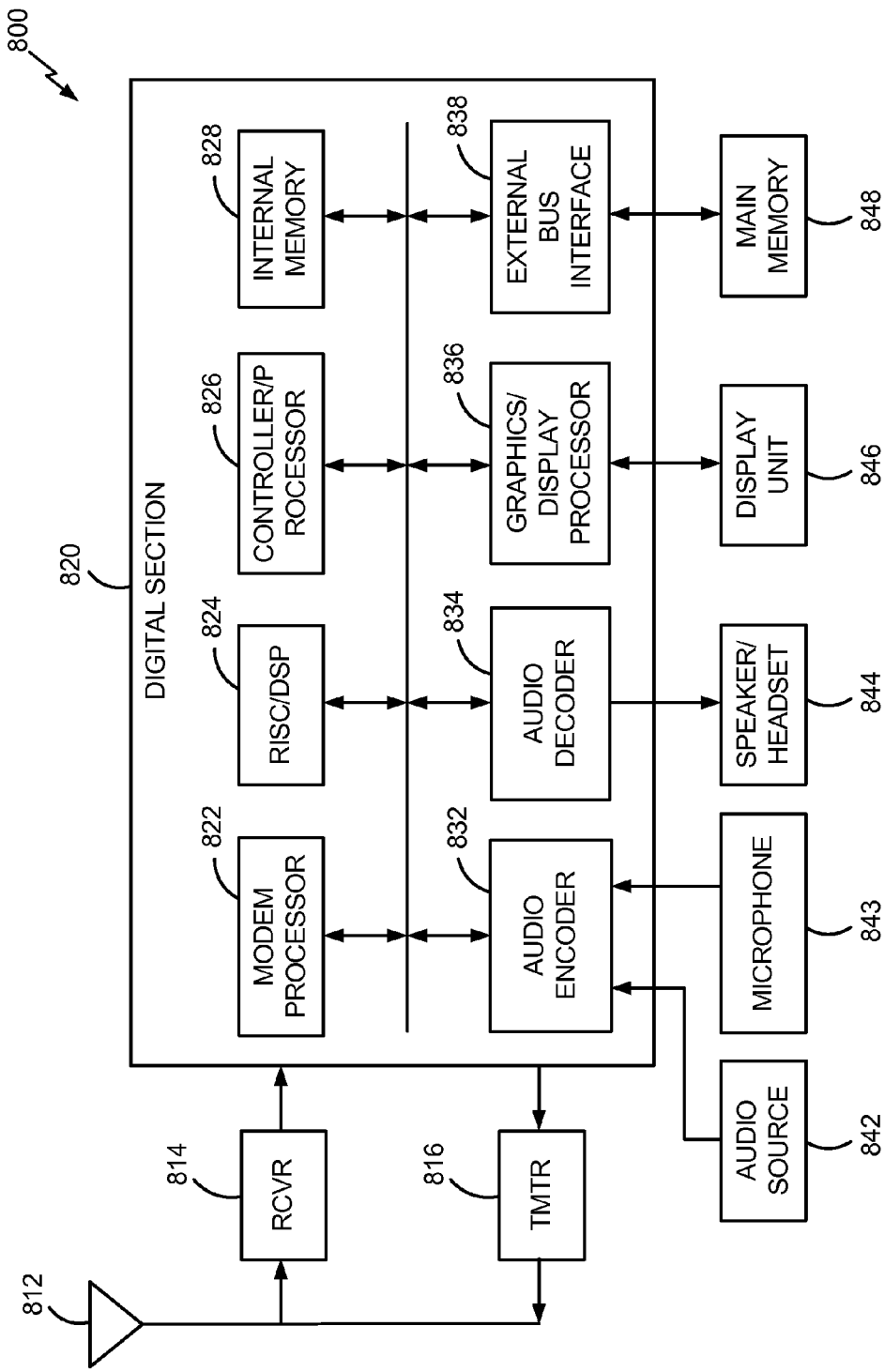
FIG. 8 is a block diagram of an exemplary electronic device in which the methods and apparatus for controlling access to a plurality of electronic device may be implemented according to some embodiments of the present disclosure.

FIG. 8 is a block diagram of an exemplary electronic device 800 in which the methods and apparatus for controlling access to a plurality of electronic devices may be implemented according to some embodiments of the present disclosure. The configuration of the electronic device 800 may be implemented in the electronic devices according to the above embodiments described with reference to FIGS. 1 to 7. The electronic device 800 may be a cellular phone, a smartphone, a phablet device, a smart watch, smart glasses, a terminal, a handset, a personal digital assistant (PDA), a wireless modem, a cordless phone, etc. The wireless communication system may be a Code Division Multiple Access (CDMA) system, a Broadcast System for Mobile Communications (GSM) system, Wideband CDMA (WCDMA) system, Long Term Evolution (LTE) system, LTE Advanced system, etc. Further, the electronic device 800 may communicate directly with another electronic device, e.g., using Wi-Fi Direct, Bluetooth, NFC, infrared communication technology or any peer-to-peer technology.

The electronic device 800 is capable of providing bidirectional communication via a receive path and a transmit path. On the receive path, signals transmitted by base stations are received by an antenna 812 and are provided to a receiver (RCVR) 814. The receiver 814 conditions and digitizes the received signal and provides samples such as the conditioned and digitized digital signal to a digital section for further processing. On the transmit path, a transmitter (TMTR) 816 receives data to be transmitted from a digital section 820, processes and conditions the data, and generates a modulated signal, which is transmitted via the antenna 812 to the base stations. The receiver 814 and the transmitter 816 may be part of a transceiver that may support CDMA, GSM, LTE, LTE Advanced, etc.

The digital section 820 includes various processing, interface, and memory units such as, for example, a modem processor 822, a reduced instruction set computer/digital signal processor (RISC/DSP) 824, a controller/processor 826, an internal memory 828, a generalized audio encoder 832, a generalized audio decoder 834, a graphics/display processor 836, and an external bus interface (EBI) 838. The modem processor 822 may perform processing for data transmission and reception, e.g., encoding, modulation, demodulation, and decoding. The RISC/DSP 824 may perform general and specialized processing for the electronic device 800. The controller/processor 826 may perform the operation of various processing and interface units within the digital section 820. The internal memory 828 may store data and/or instructions for various units within the digital section 820.

The generalized audio encoder 832 may perform encoding for input signals from an audio source 842, a microphone 843, etc. The generalized audio decoder 834 may perform decoding for coded audio data and may provide output signals to a speaker/headset 844. The graphics/display processor 836 may perform processing for graphics, videos, images, and texts, which may be presented to a display unit 846. The EBI 838 may facilitate transfer of data between the digital section 820 and a main memory 848.

The digital section 820 may be implemented with one or more processors, DSPs, microprocessors, RISCs, etc. The digital section 820 may also be fabricated on one or more application specific integrated circuits (ASICs) and/or some other type of integrated circuits (ICs).

In general, any device described herein may represent various types of devices, such as a wireless phone, a cellular phone, a laptop computer, a wireless multimedia device, a wireless communication personal computer (PC) card, a PDA, an external or internal modem, a device that communicates through a wireless channel, etc. A device may have various names, such as access terminal (AT), access unit, subscriber unit, mobile station, mobile device, mobile unit, mobile phone, mobile, remote station, remote terminal, remote unit, user device, user equipment, handheld device, etc. Any device described herein may have a memory for storing instructions and data, as well as hardware, software, firmware, or combinations thereof.

The techniques described herein may be implemented by various means. For example, these techniques may be implemented in hardware, firmware, software, or a combination thereof. Those of ordinary skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, the various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For a hardware implementation, the processing units used to perform the techniques may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

Thus, the various illustrative logical blocks, modules, and circuits described in connection with the disclosure herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

For a firmware and/or software implementation, the techniques may be embodied as instructions stored on a computer-readable medium, such as random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, or the like. The instructions may be executable by one or more processors and may cause the processor(s) to perform certain aspects of the functionality described herein.

If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium.

For example, if the software is transmitted from a website, a server, or other remote source using a coaxial cable, fiber optic cable, twisted pair, digital subscriber line (DSL), or wireless technologies such as infrared, radio, and microwave, then the coaxial cable, the fiber optic cable, the twisted pair, the DSL, or wireless technologies such as infrared, radio, and microwave are included in the definition of medium. Disk and disc, as used herein, includes CD, laser disc, optical disc, digital versatile disc (DVD), floppy disk and blu-ray disc where disks usually reproduce data magnetically, while discs reproduce data optically with lasers. Combinations of the above should also be included within the scope of computer-readable media.

A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. Alternatively, the storage medium may be integral to the processor. The processor and the storage medium may reside in an ASIC. The ASIC may reside in a user terminal. Alternatively, the processor and the storage medium may reside as discrete components in a user terminal.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices may include PCs, network servers, and handheld devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for controlling access to an electronic device, the method comprising:
   in response to determining that a first device is in contact with a user:
      adjusting a first security level of a first device from a first device lock state to a first device unlock state;
      determining, at the first device, whether a proximity between the first device and a second device satisfies a proximity threshold while the first security level corresponds to the first device unlock state; and
      sending an activation signal from the first device to the second device in response to a determination that the proximity satisfies the proximity threshold, the activation signal adjusting a second security level of the second device from a second device lock state to a second device intermediate state, the second device intermediate state enabling access to a first application of the second device without user authentication and enabling access to a second application of the second device conditioned on user authentication.

2. The method of claim 1, further comprising adjusting the first security level to a first device intermediate state.

3. The method of claim 1, wherein the first device is a wearable device that includes a sensor, and further comprising detecting whether the first device is in contact with the user by detecting, at the sensor, whether the wearable device is worn by the user.

4. The method of claim 1, wherein the first device includes an accelerometer, and further comprising detecting whether the first device is in contact with the user based on an output of the accelerometer.

5. The method of claim 1, further comprising receiving a first signal from the second device, wherein the proximity is determined based on the first signal.

6. The method of claim 5, wherein data associated with the first signal indicates a user identification code.

7. The method of claim 1, further comprising:
   after sending the activation signal, adjusting the first security level from the first device unlock state to the first device lock state in response to a determination that the first device is no longer in contact with the user.

8. The method of claim 7, further comprising sending a deactivation signal from the first device to the second device in response to the determination that the first device is no longer in contact with the user.

9. The method of claim 1, further comprising sending a third signal from the first device to the second device.

10. The method of claim 9, wherein the third signal adjusts the second security level from the second device intermediate state to the second device lock state.

11. The method of claim 1, wherein the first device comprises a mobile communication device.

12. The method of claim 1, further comprising:
   detecting an input to unlock the first device; and
   generating a notification indicating that the first security level has changed based on verification of the input.

13. The method of claim 1, wherein the proximity is determined based on a received signal strength indicator (RSSI) associated with a signal received from the second device.

14. The method of claim 13, wherein the signal comprises an ultrasound signal.

15. The method of claim 1, wherein the first device comprises a fixed location communication unit.

16. An apparatus comprising:
   security managing circuitry configured to adjust a first security level of a first device from a first device lock state to a first device unlock state in response to the first device being in contact with a user;
   device managing circuitry configured to determine whether a proximity between the first device and a second device satisfies a proximity threshold in response to adjustment of the first security level; and
   a communication unit configured to send an activation signal from the first device to the second device in response to a determination that the proximity satisfies the proximity threshold, the activation signal adjusting a second security level of the second device from a second device lock state to a second device intermediate state, the second device intermediate state enabling access to a first application of the second device without user authentication and enabling access to a second application of the second device conditioned on user authentication.

17. The apparatus of claim 16, further comprising:
   an accelerometer configured to receive a motion input of the first device; and
   user detection circuitry configured to detect whether the first device is in contact with the user based on the motion input.

18. The apparatus of claim 16, further comprising user detection circuitry configured to detect whether the first device is in contact with the user, wherein the first device is a wearable device that includes a sensor and the user detection circuitry is further configured to detect whether the wearable device is worn by the user based on an output of the sensor.

19. The apparatus of claim 16, further comprising:
an antenna; and
a receiver coupled to the antenna and configured to receive an encoded signal.

20. The apparatus of claim 19, wherein the device managing circuitry, the security managing circuitry, the antenna, and the receiver are integrated into a mobile communication device.

21. The apparatus of claim 19, wherein the device managing circuitry, the security managing circuitry, the antenna, and the receiver are integrated into a fixed location communication unit.

22. The apparatus of claim 16, wherein the security managing circuitry is further configured to detect whether the first device is no longer in contact with the user.

23. The apparatus of claim 22, wherein the security managing circuitry is further configured to adjust the first security level in response to a determination that the first device is no longer in contact with the user.

24. The apparatus of claim 16, wherein the security managing circuitry is further configured to generate a notification indicating that the first security level is adjusted.

25. The apparatus of claim 16, wherein the proximity is determined based on a received signal strength indicator (RSSI) associated with a signal received from the second device.

26. The apparatus of claim 25, wherein the signal comprises an ultrasound signal.

27. An apparatus comprising:
means for adjusting a first security level of a first device from a first device lock state to a first device unlock state in response to the first device being in contact with a user;
means for determining whether a proximity between the first device and a second device satisfies a proximity threshold in response to adjustment of the first security level; and
means for sending an activation signal from the first device to the second device in response to a determination that the proximity satisfies the proximity threshold, the activation signal adjusting a second security level of the second device from a second device lock state to a second device intermediate state, the second device intermediate state enabling access to a first application of the second device without user authentication and enabling access to a second application of the second device conditioned on user authentication.

28. The apparatus of claim 27, further comprising means for detecting whether the first device is in contact with the user.

29. The apparatus of claim 28, wherein the first device is a wearable device that includes a sensor, and wherein the means for detecting is configured to detect whether the wearable device is worn by the user based on an output of the sensor.

30. The apparatus of claim 27, wherein the means for adjusting, the means for determining, and the means for sending are included in a device that comprises a mobile communication device.

31. The apparatus of claim 27, wherein the means for adjusting is configured to detect whether the first device is no longer in contact with the user.

32. The apparatus of claim 31, wherein the means for adjusting is further configured to adjust the first security level based on the first device being no longer in contact with the user.

33. The apparatus of claim 27, further comprising means for further adjusting the first security level in response to a determination that the first device is no longer in contact with the user.

34. The apparatus of claim 27, wherein the means for adjusting, the means for determining, and the means for sending are included in a device that comprises a fixed location communication unit.

35. A non-transitory computer-readable storage medium comprising instructions for controlling access to a plurality of electronic devices, the instructions causing a processor of a first device to perform operations comprising:
adjusting a first security level of the first device from a first device lock state to a first device unlock state in response to the first device being in contact with a user;
determining whether a proximity between the first device and a second device satisfies a proximity threshold in response to adjustment of the first security level; and
initiating transmission of an activation signal from the first device to the second device in response to a determination that the proximity satisfies the proximity threshold, the activation signal adjusting a second security level of the second device from a second device lock state to a second device intermediate state, the second device intermediate state enabling access to a first application of the second device without user authentication and enabling access to a second application of the second device conditioned on user authentication.

36. The non-transitory computer-readable storage medium of claim 35, wherein the operations further comprise detecting an input to unlock the first device, and wherein the first security level is adjusted upon verification of the input.

37. The non-transitory computer-readable storage medium of claim 35, wherein the first device is a wearable device.

38. The non-transitory computer-readable storage medium of claim 35, wherein the operations further comprise adjusting the first security level in response to a determination that the first device is no longer in contact with the user.

* * * * *